United States Patent
Okamatsu et al.

(10) Patent No.: US 7,626,803 B2
(45) Date of Patent: Dec. 1, 2009

(54) DIELECTRIC CERAMIC AND MULTILAYER CERAMIC CAPACITOR

(75) Inventors: Toshihiro Okamatsu, Moriyama (JP); Takashi Hiramatsu, Kusatsu (JP); Harunobu Sano, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 407 days.

(21) Appl. No.: 11/806,501

(22) Filed: May 31, 2007

(65) Prior Publication Data
US 2007/0236865 A1    Oct. 11, 2007

Related U.S. Application Data

(63) Continuation of application No. PCT/JP2005/022346, filed on Dec. 6, 2005.

(30) Foreign Application Priority Data
Dec. 24, 2004    (JP)    ............... 2004-373168

(51) Int. Cl.
*H01G 4/06*    (2006.01)
(52) U.S. Cl. ............... 361/321.4; 361/311; 361/313; 361/321.1; 361/321.5; 361/306.1
(58) Field of Classification Search ............... 361/321.4, 361/321.1, 321.2, 321.5, 311–313, 306.1, 361/306.3, 301.1, 301.4, 303–305; 501/134–139
See application file for complete search history.

(56) References Cited

U.S. PATENT DOCUMENTS

| | | | | |
|---|---|---|---|---|
| 5,862,034 A | * | 1/1999 | Sato et al. ............... | 361/321.5 |
| 6,051,516 A | * | 4/2000 | Mizuno et al. ............... | 501/138 |
| 6,205,015 B1 | * | 3/2001 | Wada et al. ............... | 361/321.4 |
| 6,346,497 B1 | * | 2/2002 | Nakamura et al. ........... | 501/138 |
| 6,458,734 B1 | * | 10/2002 | Sugimoto et al. ............ | 501/139 |
| 6,522,521 B2 | * | 2/2003 | Mizuno et al. ............ | 361/321.4 |
| 7,046,502 B2 | * | 5/2006 | Murosawa et al. ........ | 361/321.2 |
| 7,242,571 B2 | * | 7/2007 | Okamatsu et al. ........ | 361/321.2 |

FOREIGN PATENT DOCUMENTS

| | | |
|---|---|---|
| JP | 2004-349168 | 12/1992 |
| JP | 2005-187296 | 7/2005 |
| WO | WO 2004/067473 A1 | 8/2004 |

OTHER PUBLICATIONS

Written Opinion of the International Searching Authority dated Feb. 7, 2006.

* cited by examiner

*Primary Examiner*—Nguyen T Ha
(74) *Attorney, Agent, or Firm*—Dickstein Shapiro LLP

(57) ABSTRACT

A dielectric ceramic is provided having a high relative dielectric constant, and in the case in which it is used for a multilayer ceramic capacitor, high insulating properties and superior reliability can be obtained even when the thickness of a dielectric ceramic layer is decreased. The dielectric ceramic used for forming the dielectric ceramic layer of a multilayer ceramic capacitor has a composition represented by $100(Ba_{1-w-x-m}Ca_wSr_xGd_m)_k(Ti_{1-y-z-n}Zr_yHf_zMg_n)O_{3+a} + pMnO_2 + qSiO_2 + rCuO$, in which $0.995 \leq k \leq 1.010$, $0 \leq w < 0.04$, $0 \leq x \leq 0.04$, $0 \leq y \leq 0.10$, $0 \leq z \leq 0.05$, $0.015 \leq m \leq 0.035$, $0.015 \leq n \leq 0.035$, $0.01 \leq p \leq 1.0$, $0.5 \leq q \leq 2.5$, and $0.01 \leq r \leq 5.0$. In addition, a is a value selected with respect to the deviation from 3 so that the primary component is electrically neutral.

20 Claims, 1 Drawing Sheet

DIELECTRIC CERAMIC AND MULTILAYER CERAMIC CAPACITOR

This is a continuation of application Ser. No. PCT/JP2005/022346, filed Dec. 6, 2005.

TECHNICAL FIELD

The present invention relates to a dielectric ceramic and a multilayer ceramic capacitor formed using the dielectric ceramic, and more particularly, relates to an improvement capable of further decreasing the thickness of a dielectric ceramic layer of a multilayer ceramic capacitor formed using a dielectric ceramic.

BACKGROUND ART

A dielectric ceramic that includes a primarily component and additive components has been disclosed in International Publication No. 2004/067473 pamphlet (Patent Document 1). In this dielectric ceramic, the primary component is a barium titanate-based composite oxide represented by a general formula of $(Ba_{1-h-i-m}Ca_hSr_iGd_m)_k(Ti_{1-y-j-n}Zr_yHf_jMg_n)O_3$, where $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$ are satisfied, Ba is partly replaced with Gd, and Ti is partly replaces with Mg. In addition, additive components are Ma (Ma is at least one of Ba, Sr and Ca), Mb (Mb is at least one of Mn and Ni) and Mc (Mc is Si or Si and Ti), in which more than 0 but less than 1.5 moles of Ma is contained with respect to 100 moles of the primary component, more than 0 but less than 1.0 mole of Mb is contained with respect to 100 moles of the primary component, and 0.5 to 2.0 moles of Mc is contained with respect to 100 moles of the primary component.

When dielectric ceramic layers of a multilayer ceramic capacitor are prepared using the above dielectric ceramic, since sintering stability is superior, humidity resistance is improved, the F characteristic specified by the JIS standard and the Y5V characteristic specified by the EIA standard are both satisfied, a relative dielectric constant of 9,000 or more can be obtained, and the multilayer ceramic capacitor can be used in a wide temperature range.

In addition, even when the thickness of the dielectric ceramic layer is decreased, the reduction in size and increase in capacity of the multilayer ceramic capacitor can be realized by decreasing the thickness of the dielectric ceramic layer, and in addition, it is not necessary to decrease the rated voltage since the humidity resistance and the high-temperature reliability are superior. Hence, even when the thickness of the dielectric ceramic layer is decreased, for example, to 3 μm, sufficient practical properties can be imparted to a multilayer ceramic capacitor.

In addition, this dielectric ceramic is not rendered semi-conductive and may have a high relative resistance even when fired in a neutral or a reducing atmosphere; hence, when a multilayer ceramic capacitor is formed using this dielectric ceramic, a base metal as a conductive component contained in internal electrodes may be used without causing any problems. As a result, cost of the multilayer ceramic capacitor can be reduced.

However, it was found that in the case in which dielectric ceramic layers of a multilayer ceramic capacitor are formed using the dielectric ceramic disclosed in Patent Document 1 and the thickness of the dielectric ceramic layer is decreased to 2 μm or less, it may become difficult in some cases to ensure the reliability. In addition, in order to sinter the dielectric ceramic disclosed in Patent Document 1, a high firing temperature, such as approximately 1,200° C. or 1,200° C. or more, is required.

DISCLOSURE OF INVENTION

Problems to be Solved by the Invention

Accordingly, an object of the present invention is to provide a dielectric ceramic capable of solving the above problems.

Another object of the present invention is to provide a multilayer ceramic capacitor formed using the aforementioned dielectric ceramic.

Means for Solving the Problems

In order to solve the above technical problems, a dielectric ceramic according to the present invention has a composition represented by the general formula:

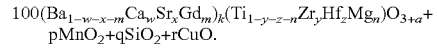
$$pMnO_2 + qSiO_2 + rCuO.$$

In the above general formula, $(Ba_{1-w-x-m}Ca_wSr_xGd_m)_k(Ti_{1-y-z-n}Zr_yHf_zMg_n)O_{3+a}$ is a primary component, the units of each of k, w, x, y, z, m, n, p, q, and r are moles, $0.995 \leq k \leq 1.010$,
$0 \leq w < 0.04$,
$0 \leq x \leq 0.04$,
$0 \leq z \leq 0.05$,
$0.015 \leq m \leq 0.035$,
$0.015 \leq n \leq 0.035$,
$0.01 \leq p \leq 1.0$,
$0.5 \leq q \leq 2.5$, and
$0.01 \leq r \leq 5.0$, and a is a value selected with respect to the deviation from 3 so that the primary component is electrically neutral.

The dielectric ceramic according to the present invention preferably further includes as an additive component 0.50 moles or less of $Re_2O_3$ (Re is at least one selected from the group consisting of Y, Sm, Eu, Tb, Dy, Ho, Er, Tm and Yb) with respect to 100 moles of the above primary component.

The present invention is also directed to a multilayer ceramic capacitor including: a laminate including dielectric ceramic layers laminated to each other and internal electrodes which are formed along specific interfaces between the dielectric ceramic layers and which are overlapped with each other in the lamination direction; and external electrodes formed on external surfaces of the laminate so as to be electrically connected to specific internal electrodes. In this multilayer ceramic capacitor according to the present invention, the dielectric ceramic layers are composed of the above-described dielectric ceramic according to the present invention.

In the multilayer ceramic capacitor according to the present invention, the internal electrodes preferably include a base metal as a primary component.

Advantages

The dielectric ceramic according to the present invention includes elements common to the dielectric ceramic disclosed in Patent Document 1, and the primary component is substantially the same as that thereof; however, the dielectric ceramic of the present invention is different from that disclosed in Patent Document 1 since it includes Cu as an additive component.

When a dielectric ceramic layer in a multilayer ceramic capacitor is formed using this dielectric ceramic which has the above particular structure, even when the thickness of the dielectric ceramic layer is decreased, the reliability is high, and sintering can be performed at a low temperature as compared to the dielectric ceramic disclosed in Patent Document 1. In addition, the change in electrostatic capacity with time at room temperature can be decreased. At the same time, substantially the same the relative dielectric constant, temperature characteristic, and resistivity as those of the dielectric ceramic disclosed in Patent Document 1 can be obtained.

More particularly, the relative dielectric constant of the dielectric ceramic of the present invention is high, such as 10,000 or more; the F characteristic specified by the JIS standard and the Y5V characteristic specified by the EIA standard are both satisfied; the resistivity is high, such as $10^{11}$ $\Omega \cdot$cm or more; and the time to reach failure in an accelerated reliability test is long, so that high reliability can be obtained.

In addition, the dielectric ceramic according to the present invention can impart superior humidity resistance and superior reliability at a high temperature to a dielectric ceramic layer of a multilayer ceramic capacitor even when the thickness of the dielectric ceramic layer is decreased. Hence, the reduction in size and increased in capacity of the multilayer ceramic capacitor can be realized by decreasing the thickness of the dielectric ceramic layer, and even when the thickness of the dielectric ceramic layer is decreased, it is not necessary to decrease the rated voltage. Accordingly, sufficient practical properties can be imparted to the multilayer ceramic capacitor even when the thickness of the dielectric ceramic layer is decreased, for example, to 2 μm or less.

When 0.50 moles or less of $Re_2O_3$ (Re is at least one selected from the group consisting of Y, Sm, Eu, Tb, Dy, Ho, Er, Tm and Yb) is further contained in the dielectric ceramic of the present invention with respect to 100 moles of the primary component, the absolute value of the rate of change with time in electrostatic capacity at room temperature of the multilayer ceramic capacitor, which is formed by using the above dielectric ceramic, can be further decreased.

Figure 1:
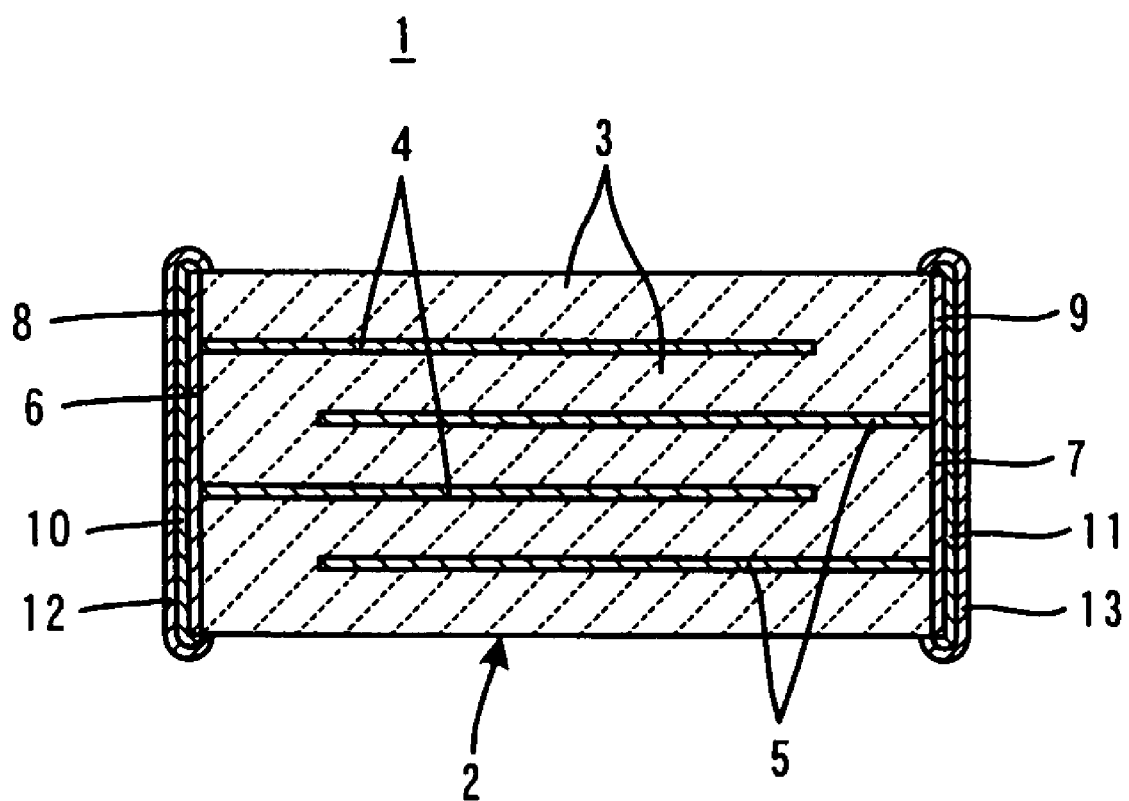
FIG. 1 is a cross-sectional view schematically showing a multilayer ceramic capacitor 1 formed using a dielectric ceramic according to the present invention.

REFERENCE NUMERALS 1 multilayer ceramic capacitor
2 laminate
3 dielectric ceramic layer
4, 5 internal electrode
8, 9 external electrode

BEST MODE FOR CARRYING OUT THE INVENTION

FIG. 1 is a cross-sectional view schematically showing a multilayer ceramic capacitor 1 formed using a dielectric ceramic according to the present invention.

The multilayer ceramic capacitor 1 is a rectangular parallelepiped laminate 2 as a whole. The laminate 2 is formed of a plurality of dielectric ceramic layers 3 laminated to each other and a plurality of internal electrodes 4 and 5 formed along a plurality of specific interfaces between the dielectric ceramic layers 3. The internal electrodes 4 and 5 are formed to reach external surfaces of the laminate 2; however, the internal electrodes 4 extended to one end surface 6 of the laminate 2 and the internal electrodes 5 extended to the other end surface 7 are alternately disposed in the laminate 2.

On the end surfaces 6 and 7, which are the external surfaces of the laminate 2, a conductive paste is applied, followed by baking, so that external electrodes 8 and 9 are formed, respectively. On the external electrodes 8 and 9, first plating layers 10 and 11 composed of nickel, copper, a nickel-copper alloy or the like, are respectively formed, whenever necessary, and in addition, on the above plating layers, second plating layers 12 and 13 composed of solder, tin or the like, are formed, respectively.

In the multilayer ceramic capacitor 1, the internal electrodes 4 and 5 are formed so as to be overlapped with each other in the lamination direction, and hence an electrostatic capacity is formed between adjacent internal electrodes 4 and 5. In addition, the internal electrodes 4 are electrically connected to the external electrode 8, and the internal electrodes 5 are electrically connected to the external electrode 9; hence, through these external electrodes 8 and 9, the above electrostatic capacity can be obtained.

The dielectric ceramic layer 3 is formed from the following dielectric ceramic that is the feature of the present invention.

That is, the dielectric ceramic layer 3 is formed from a dielectric ceramic having a composition represented by the general formula of

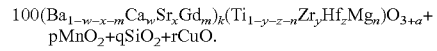

In the above general formula, $(Ba_{1-w-x-m}Ca_wSr_xGd_m)_k$ $(Ti_{1-y-z-n}Zr_yHf_zMg_n)O_{3+a}$ is a primary component, the units each of k, w, x, y, z, m, n, p, q, and r are moles, $0.995 \leq k \leq 1.010$,
$0 \leq w < 0.04$,
$0 \leq x \leq 0.04$,
$0 \leq z \leq 0.05$,
$0.015 \leq m \leq 0.035$,
$0.015 \leq n \leq 0.035$,
$0.01 \leq p \leq 1.0$,
$0.5 \leq q \leq 2.5$,
$0.01 \leq r \leq 5.0$, and a is a value selected with respect to the deviation from 3 so that the primary component is electrically neutral.

When the dielectric ceramic layers 3 are formed using the dielectric ceramic described above, the reliability of the multilayer ceramic capacitor 1 can be made superior such that, as apparent from experimental examples described later, the relative dielectric constant is high, such as 10,000 or more, the F characteristic specified by the JIS standard and the Y5V characteristic specified by the EIA standard are both satisfied, the resistivity is high, such as $10^{11}$ $\Omega \cdot$cm or more, and the mean time to failure in an accelerated reliability test (150° C., DC electric field strength: 16.8 V/μm) is more than 20 hours.

In addition, since superior humidity resistance and reliability at high temperature can be ensured even when the thickness of the dielectric ceramic layer 3 is decreased, a reduction in size and increase in capacity of the multilayer ceramic capacitor 1 can be realized. In addition, it is not necessary to decrease the rated voltage even when the thickness of the dielectric ceramic layer 3 is decreased. Hence, even when the thickness of the dielectric ceramic layer 3 is decreased to 2 μm or less, sufficient practical properties can be imparted to the multilayer ceramic capacitor 1.

In addition, the dielectric ceramic described above can be fired in a neutral or a reducing atmosphere, a base metal, such as nickel, a nickel alloy, copper or a copper alloy, can be used as a material for the internal electrodes 4 and 5.

The dielectric ceramic forming the dielectric ceramic layer 3 preferably contains 0.50 moles or less of $Re_2O_3$ (Re is at least one selected from the group consisting of Y, Sm, Eu, Tb, Dy, Ho, Er, Tm and Yb) as an additive component with respect to 100 moles of the above primary component. Accordingly, the absolute value of the rate of change with time in electrostatic capacity at room temperature of the multilayer ceramic capacitor 1 can be further decreased. When more than 0.50 moles of $Re_2O_3$ is contained, the relative dielectric constant of the dielectric ceramic is decreased.

Next, a method for manufacturing the multilayer ceramic capacitor 1 shown in FIG. 1 will be described.

First, a powdered starting material for a dielectric ceramic forming the dielectric ceramic layer 3 is prepared. This powdered staring material is preferably formed as follows.

That is, a primary component having a composition represented by the general formula of $(Ba_{1-w-x-m}Ca_wSr_xGd_m)_k(Ti_{1-y-z-n}Zr_yHf_zMg_n)O_{3+a}$ is synthesized with k, w, x, y, z, m, and n are in the respective ranges of $0.995 \leq k \leq 1.010$, $0 \leq w < 0.04$, $0 \leq x \leq 0.04$, $0 \leq y \leq 0.10$, $0 \leq z \leq 0.05$, $0.015 \leq m \leq 0.035$, and $0.015 \leq n \leq 0.035$.

More particularly, compounds containing respective elements included in the above primary component, such as $BaCO_3$, $CaCO_3$, $SrCO_3$, $TiO_2$, $ZrO_2$, $HfO_2$, $Gd_2O_3$ and $MgCO_3$, are mixed together so as to obtain the above composition ratios and are then calcined in the atmosphere, followed by pulverization.

Compounds other than the carbonates and oxides mentioned above may also be used as the compounds containing respective elements included in the primary component. In addition, besides the above calcination method, an alkoxide method, a coprecipitation method, or a hydrothermal synthesis method may also be used as a method for obtaining the above powder.

As the additive component, powders of $MnCO_3$, $SiO_2$, and CuO are prepared. As mentioned above, compounds other than the above carbonate and oxides may also be used.

Next, $MnCO_3$, $SiO_2$ and CuO are mixed together so as to have 0.01 to 1.0 mole, 0.5 to 2.5 moles, and 0.01 to 5.0 moles, respectively, with respect to 100 moles of the primary component. This mixed powder is used as the powdered starting material for the dielectric ceramic.

In the above mixing step, with respect to 100 moles of the primary component, 0.50 moles or less of $Re_2O_3$ (Re is at least one selected from the group consisting of Y, Sm, Eu, Tb, Dy, Ho, Er, Tm and Yb) may also be mixed together as an additive component.

Among alkali metal oxides, such as $Na_2O$ and $K_2O$, and other oxides such as $Al_2O_3$, which can be present as an impurity in the powder contained as the primary component, and particularly, the content of the alkali metal oxides, such as $Na_2O$ and $K_2O$, have a relatively large influence on electrical properties. However, it is also confirmed that when the content of the alkali metal oxides that can be present as an impurity as described above is less than 0.02 percent by weight of $(Ba_{1-w-x-m}Ca_wSr_xGd_m)_k(Ti_{1-y-z-n}Zr_yHf_zMg_n)O_{3+a}$ as the primary component, the electrical properties are not degraded.

Next, an organic binder and a solvent are added to the powdered starting material for the dielectric ceramic thus obtained and are then mixed together to form a slurry, and by using this slurry, formed are ceramic green sheets to be formed into the dielectric ceramic layers 3.

Next, on a specific ceramic green sheet, a conductive paste film to be formed into the internal electrode 4 or 5 is formed, for example, by screen printing. This conductive paste film contains a base metal, such as nickel, a nickel alloy, copper or a copper alloy, as a conductive component. In addition, the internal electrodes 4 and 5 may be formed by a deposition method, a plating method or the like, instead of a printing method such as a screen printing method.

Next, after a plurality of ceramic green sheets on which the conductive past films are formed as described above are laminated to each other, ceramic green sheets on which no conductive past films are formed are laminated so as to sandwich the laminated ceramic green sheets and are then pressure-bonded, followed by performing cutting whenever necessary, so that a green laminate to be formed into the laminate 2 is obtained. In this green laminate, end portions of the conductive paste films are each exposed to either one of the end surfaces.

Next, the green laminate is fired in a reducing atmosphere. By this treatment, the sintered laminate 2 shown in FIG. 1 is obtained, and in the laminate 2, the above ceramic green sheets form the dielectric ceramic layers 3 composed of the dielectric ceramic, and the conductive paste films form the internal electrodes 4 and 5.

The dielectric ceramic forming the above dielectric ceramic layers 3 has a composition represented by the general formula of $100\ (Ba_{1-w-x-m}Ca_wSr_xGd_m)_k(Ti_{1-y-z-n}Zr_yHf_zMg_n)O_{3+a}+pMnO_2+qSiO_2+rCuO$. In this general formula, Gd, a rare earth element, is in the A site of perovskite, and in addition, Mg is in the B site of perovskite. This indicates that Gd is solid-solved (that is, replaced) in the A site, and that Mg is solid-solved (that is, replaced) in the B site. In order to solid-solve Gd and Mg in the state described above, calcination is performed on a mixture of $Gd_2O_3$ and $MgCO_3$ with $BaCO_3$, $TiO_2$, and the like.

It is preferable that Gd is solid-solved primarily in the A site of perovskite and that Mg is solid-solved primarily in the B site of perovskite in the dielectric ceramic forming the dielectric ceramic layers 3. However, as long as the objects of the present invention are not deteriorated, a trace amount of Gd may be present in grain boundaries or the B site of perovskite, and a trace amount of Mg may be present in grain boundaries or the A site of perovskite.

Next, the external electrodes 8 and 9 are formed so as to be electrically connected to the exposed ends of the internal electrodes 4 and 5, respectively, by applying a conductive paste on the end surfaces 6 and 7, respectively, of the laminate 2, followed by baking.

The external electrodes 8 and 9 are formed, in general, by applying a conductive paste to the external surfaces of the fired laminate 2, followed by baking, as described above; however, the external electrodes 8 and 9 may be formed by applying a conductive paste on external surfaces of the green laminate that is not processed by firing and then performing baking concomitant with firing to obtain the laminate 2.

Next, whenever necessary, on the external electrodes 8 and 9, plating of nickel, copper or the like is performed, so that the first plating layers 10 and 11 are formed. Subsequently, on the first plating layers 10 and 11, plating of solder, tin or the like is performed, so that the second plating layers 12 and 13 are formed.

Accordingly, the multilayer ceramic capacitor 1 is completed.

Next, the present invention will be described in more detail with reference to experimental examples. The experimental examples also have an important role to show the reasons to limit the range of the present invention or a preferable range thereof.

EXPERIMENTAL EXAMPLES

Experimental Example 1

As starting materials for a dielectric ceramic, powders of high purity $BaCO_3$, $CaCO_3$, $SrCO_3$, $TiO_2$, $ZrO_2$, $HfO_2$, $Gd_2O_3$ and $MgCO_3$ were prepared.

Next, in order to obtain a primary component represented by $(Ba_{1-w-x-m}Ca_wSr_xGd_m)_k(Ti_{1-y-z-n}Zr_yHf_zMg_n)O_{3+a}$, the above powdered starting materials were mixed together so as to have molar ratios shown in respective columns of [k], [w], [x], [y], [z], [m] and [n] of Table 1, followed by wet-pulverization. Subsequently, after drying was performed, the mixed powder was heated to a temperature of 900° C. or more in the atmosphere to obtain a $(Ba_{1-w-x-m}Ca_wSr_xGd_m)_k(Ti_{1-y-z-n}Zr_yHf_zMg_n)O_{3+a}$ powder by synthesis and was pulverized to obtain an average particle diameter of 0.2 to 0.4 μm.

In addition, powders of $MnCO_3$, $SiO_2$, and CuO were prepared.

The above individual powders of $MnCO_3$, $SiO_2$ and CuO were added to and were mixed with the powdered primary component synthesized beforehand so as to obtain molar ratios in the form of $MnO_2$, $SiO_2$ and CuO, respectively, shown in the respective columns of [p], [q] and [r] of Table 1, so that powdered dielectric ceramic starting materials for respective samples were obtained.

TABLE 1

| SAMPLE NO. | $100(Ba_{1-w-x-m}Ca_wSr_xGd_m)_k(Ti_{1-y-z-n}Zr_yHf_zMg_n)O_{3+a} + pMnO_2 + qSiO_2 + rCuO$ |||||||||
|---|---|---|---|---|---|---|---|---|---|
| | k | w | x | y | z | m | n | p | q | r |
| *1 | 0.993 | 0.02 | 0.00 | 0.05 | 0.00 | 0.025 | 0.025 | 0.5 | 1.5 | 2.5 |
| 2 | 0.995 | 0.02 | 0.00 | 0.05 | 0.00 | 0.025 | 0.025 | 0.5 | 1.5 | 2.5 |
| 3 | 1.002 | 0.02 | 0.00 | 0.05 | 0.00 | 0.025 | 0.025 | 0.5 | 1.5 | 2.5 |
| 4 | 1.010 | 0.02 | 0.00 | 0.05 | 0.00 | 0.025 | 0.025 | 0.5 | 1.5 | 2.5 |
| *5 | 1.012 | 0.02 | 0.00 | 0.05 | 0.00 | 0.025 | 0.025 | 0.5 | 1.5 | 2.5 |
| 6 | 1.002 | 0.00 | 0.00 | 0.05 | 0.00 | 0.025 | 0.025 | 0.5 | 1.5 | 2.5 |
| 7 | 1.002 | 0.03 | 0.00 | 0.05 | 0.00 | 0.025 | 0.025 | 0.5 | 1.5 | 2.5 |
| *8 | 1.002 | 0.04 | 0.00 | 0.05 | 0.00 | 0.025 | 0.025 | 0.5 | 1.5 | 2.5 |
| 9 | 1.002 | 0.02 | 0.02 | 0.05 | 0.00 | 0.025 | 0.025 | 0.5 | 1.5 | 2.5 |
| 10 | 1.002 | 0.02 | 0.04 | 0.05 | 0.00 | 0.025 | 0.025 | 0.5 | 1.5 | 2.5 |
| *11 | 1.002 | 0.02 | 0.05 | 0.05 | 0.00 | 0.025 | 0.025 | 0.5 | 1.5 | 2.5 |
| 12 | 1.002 | 0.02 | 0.00 | 0.00 | 0.00 | 0.025 | 0.025 | 0.5 | 1.5 | 2.5 |
| 13 | 1.002 | 0.02 | 0.00 | 0.01 | 0.00 | 0.025 | 0.025 | 0.5 | 1.5 | 2.5 |
| 14 | 1.002 | 0.02 | 0.00 | 0.10 | 0.00 | 0.025 | 0.025 | 0.5 | 1.5 | 2.5 |
| *15 | 1.002 | 0.02 | 0.00 | 0.12 | 0.00 | 0.025 | 0.025 | 0.5 | 1.5 | 2.5 |
| 16 | 1.002 | 0.02 | 0.00 | 0.05 | 0.02 | 0.025 | 0.025 | 0.5 | 1.5 | 2.5 |
| 17 | 1.002 | 0.02 | 0.00 | 0.05 | 0.05 | 0.025 | 0.025 | 0.5 | 1.5 | 2.5 |
| *18 | 1.002 | 0.02 | 0.00 | 0.05 | 0.06 | 0.025 | 0.025 | 0.5 | 1.5 | 2.5 |
| *19 | 1.002 | 0.02 | 0.00 | 0.05 | 0.00 | 0.013 | 0.025 | 0.5 | 1.5 | 2.5 |
| 20 | 1.002 | 0.02 | 0.00 | 0.05 | 0.00 | 0.015 | 0.025 | 0.5 | 1.5 | 2.5 |
| 21 | 1.002 | 0.02 | 0.00 | 0.05 | 0.00 | 0.035 | 0.025 | 0.5 | 1.5 | 2.5 |
| *22 | 1.002 | 0.02 | 0.00 | 0.05 | 0.00 | 0.037 | 0.025 | 0.5 | 1.5 | 2.5 |
| *23 | 1.002 | 0.02 | 0.00 | 0.05 | 0.00 | 0.025 | 0.013 | 0.5 | 1.5 | 2.5 |
| 24 | 1.002 | 0.02 | 0.00 | 0.05 | 0.00 | 0.025 | 0.015 | 0.5 | 1.5 | 2.5 |
| 25 | 1.002 | 0.02 | 0.00 | 0.05 | 0.00 | 0.025 | 0.035 | 0.5 | 1.5 | 2.5 |
| *26 | 1.002 | 0.02 | 0.00 | 0.05 | 0.00 | 0.025 | 0.037 | 0.5 | 1.5 | 2.5 |
| *27 | 1.002 | 0.02 | 0.00 | 0.05 | 0.00 | 0.025 | 0.025 | 0.0 | 1.5 | 2.5 |
| 28 | 1.002 | 0.02 | 0.00 | 0.05 | 0.00 | 0.025 | 0.025 | 0.01 | 1.5 | 2.5 |
| 29 | 1.002 | 0.02 | 0.00 | 0.05 | 0.00 | 0.025 | 0.025 | 1.0 | 1.5 | 2.5 |
| *30 | 1.002 | 0.02 | 0.00 | 0.05 | 0.00 | 0.025 | 0.025 | 1.2 | 1.5 | 2.5 |
| *31 | 1.002 | 0.02 | 0.00 | 0.05 | 0.00 | 0.025 | 0.025 | 0.5 | 0.3 | 2.5 |
| 32 | 1.002 | 0.02 | 0.00 | 0.05 | 0.00 | 0.025 | 0.025 | 0.5 | 0.5 | 2.5 |
| 33 | 1.002 | 0.02 | 0.00 | 0.05 | 0.00 | 0.025 | 0.025 | 0.5 | 2.5 | 2.5 |
| *34 | 1.002 | 0.02 | 0.00 | 0.05 | 0.00 | 0.025 | 0.025 | 0.5 | 2.7 | 2.5 |
| *35 | 1.002 | 0.02 | 0.00 | 0.05 | 0.00 | 0.025 | 0.025 | 0.5 | 1.5 | 0.0 |
| 36 | 1.002 | 0.02 | 0.00 | 0.05 | 0.00 | 0.025 | 0.025 | 0.5 | 1.5 | 0.01 |
| 37 | 1.002 | 0.02 | 0.00 | 0.05 | 0.00 | 0.025 | 0.025 | 0.5 | 1.5 | 1.0 |
| 38 | 1.002 | 0.02 | 0.00 | 0.05 | 0.00 | 0.025 | 0.025 | 0.5 | 1.5 | 4.0 |
| 39 | 1.002 | 0.02 | 0.00 | 0.05 | 0.00 | 0.025 | 0.025 | 0.5 | 1.5 | 5.0 |
| *40 | 1.002 | 0.02 | 0.00 | 0.05 | 0.00 | 0.025 | 0.025 | 0.5 | 1.5 | 5.3 |

Next, a poly(vinyl butyral)-based binder and an organic solvent such as ethanol were added to each of the powdered dielectric ceramic starting materials shown in Table 1 and were wet-mixed using a ball mill, so that a ceramic slurry was obtained.

The ceramic slurry was next formed into a sheet by a gravure coater method, so that a ceramic green sheet having a thickness of 2 μm was obtained.

Next, on the ceramic green sheet, a conductive paste containing nickel as a primary component was printed, so that a conductive paste film to be formed into an internal electrode was formed.

A plurality of ceramic green sheets are then laminated to each other so that sides thereof to which the above conductive paste films are extended are alternately disposed, so that a green laminate was obtained.

After the green laminate was heated to a temperature of 250° C. in the atmosphere to burn off the binder, firing was performed in a reducing atmosphere composed of a $H_2$—$N_2$—$H_2O$ gas at an oxygen partial pressure of $10^{-9}$ to $10^{-12}$ MPa for 2 hours at each temperature shown in the column of [firing temperature] of Table 2, so that the sintered laminate was obtained.

Next, a conductive paste containing a $B_2O_3$—$SiO_2$—BaO-based glass frit together with silver as a conductive component was applied onto the two end surfaces of the sintered laminate, and baking was performed at a temperature of 800° C. in a nitrogen atmosphere, so that external electrodes electrically connected to the internal electrodes were formed.

The outer dimension of the multilayer ceramic capacitor thus obtained had a width of 1.2 mm, a length of 2.0 mm and a thickness of 0.5 mm, and the thickness of the dielectric ceramic layer provided between the internal electrodes was 1.5 μm. In addition, the number of effective dielectric ceramic layers was 10, and the facing electrode area per one layer was $1.3 \times 10^{-6}$ $m^2$.

For _[??] specimens of each of the samples thus obtained, evaluations shown in Table 2 were performed as now described.

First, when a multilayer ceramic capacitor sample was short-circuited or was opened, it was regarded as a defective, and the percentage of specimens of each sample that was defective was determined ans is listed as for the "fraction defective". The following evaluations were performed for samples other than defectives.

To determine the [relative dielectric constant], the electrostatic capacity was measured using an automatic bridge type measurement device in accordance with JIS standard [5102], and the relative dielectric constant was calculated from a measured electrostatic capacity.

The [tan δ] was also measured by using an automatic bridge type measurement device.

As for the [resistivity (log ρ)], the insulating resistance at 25° C. was measured by applying a direct voltage of 4.2 kV/mm for 2 minutes using an insulating resistance tester, and the resistivity was calculated from the insulating resistance.

The [F characteristic] of the JIS standard sets a limit in the rate of change in capacitance between −25° C. and +85° C. based on an electrostatic capacity at a temperature of 20° C. An evaluation was performed to determine whether this limit is satisfied or not, that is, whether this is in the specification or not.

The [Y5V characteristic] of the EIA standard sets a limit on the rate of change in capacitance between −30° C. and +85° C. based on an electrostatic capacity at a temperature of 25° C. An evaluation was performed to determine whether this limit is satisfied or not, that is, whether this is in the specification or not.

A high temperature load test was performed in which the rate of change with time in insulating resistance was measured while a direct voltage was applied at a temperature of 150° C. so as to obtain an electric field strength of 16.8 V/μm. When the insulating resistance of each sample reached $10^{5.0}$ Ω or less, this point of time was regarded as a failure, and the average value of times reaching this defect was obtained and recorded as [mean time to failure].

The rate of change in electrostatic capacity of a sample left for 240 hours at room temperature relative to the electrostatic capacity which was obtained at the stage at which a sample had been left in a no-load state for more than 30 minutes at a temperature of 150° C. or more and was then left at room temperature (25° C.) for 24 hours is designated the [rate of change with time in electrostatic capacity at room temperature].

TABLE 2

| Sample No. | Firing Temperature (° C.) | Relative Dielectric Constant | tan δ (%) | Resistivity log ρ (ρ:Ω · cm) | Mean Time to Failure (Hours) | Rate of Change with Time in Electrostatic Capacity at Room Temperature (%) | F Characteristic | Y5V Characteristic | Fraction Defective (%) |
|---|---|---|---|---|---|---|---|---|---|
| *1 | 1,160 | 10,100 | 12.0 | 9.1 | Not measurable | −9.3 | In specification | In specification | 0 |
| 2 | 1,180 | 10,700 | 12.6 | 11.0 | 20 | −9.5 | In specification | In specification | 0 |
| 3 | 1,180 | 12,100 | 14.0 | 11.3 | 26 | −10.7 | In specification | In specification | 0 |
| 4 | 1,200 | 10,200 | 11.9 | 11.3 | 21 | −9.3 | In specification | In specification | 0 |
| *5 | 1,220 | 8,900 | 10.5 | 11.1 | 11 | −8.5 | In specification | In specification | 0 |
| 6 | 1,180 | 12,200 | 14.1 | 11.2 | 25 | −10.9 | In specification | In specification | 0 |
| 7 | 1,180 | 10,000 | 11.9 | 11.3 | 38 | −9.2 | In specification | In specification | 0 |
| *8 | 1,220 | 8,000 | 10.1 | 11.4 | 41 | −8.1 | In specification | In specification | 0 |
| 9 | 1,180 | 11,000 | 12.4 | 11.2 | 25 | −9.7 | In specification | In specification | 0 |
| 10 | 1,180 | 10,200 | 11.5 | 11.1 | 21 | −9.5 | In specification | In specification | 0 |
| *11 | 1,180 | 9,800 | 10.8 | 11.1 | 15 | −9.2 | In specification | In specification | 0 |
| 12 | 1,180 | 13,300 | 15.0 | 11.2 | 30 | −11.0 | In specification | In specification | 0 |
| 13 | 1,180 | 13,400 | 15.1 | 11.1 | 29 | −11.0 | In specification | In specification | 0 |
| 14 | 1,180 | 10,900 | 12.7 | 11.2 | 20 | −9.7 | In specification | In specification | 0 |
| *15 | 1,180 | 9,200 | 11.0 | 11.5 | 17 | −8.7 | In specification | In specification | 0 |
| 16 | 1,180 | 11,100 | 12.7 | 11.2 | 28 | −9.7 | In specification | In specification | 0 |
| 17 | 1,180 | 10,600 | 12.5 | 11.3 | 22 | −9.4 | In specification | In specification | 0 |

TABLE 2-continued

| Sample No. | Firing Temperature (° C.) | Relative Dielectric Constant | tan δ (%) | Resistivity log ρ (ρ:Ω · cm) | Mean Time to Failure (Hours) | Rate of Change with Time in Electrostatic Capacity at Room Temperature (%) | F Characteristic | Y5V Characteristic | Fraction Defective (%) |
|---|---|---|---|---|---|---|---|---|---|
| *18 | 1,180 | 10,200 | 12.0 | 11.2 | 14 | −9.2 | In specification | In specification | 0 |
| *19 | 1,180 | 12,000 | 14.0 | 10.3 | 4 | −10.7 | In specification | In specification | 0 |
| 20 | 1,180 | 11,700 | 13.2 | 11.0 | 20 | −10.5 | In specification | In specification | 0 |
| 21 | 1,200 | 10,200 | 12.3 | 11.3 | 39 | −9.3 | In specification | In specification | 0 |
| *22 | 1,220 | 8,800 | 10.6 | 11.4 | 48 | −8.5 | In specification | In specification | 0 |
| *23 | 1,180 | 14,100 | 16.3 | 10.2 | 10 | −11.4 | In specification | In specification | 2 |
| 24 | 1,180 | 11,900 | 13.8 | 11.0 | 21 | −10.6 | In specification | In specification | 0 |
| 25 | 1,180 | 10,200 | 12.0 | 11.2 | 33 | −9.3 | In specification | In specification | 0 |
| *26 | 1,200 | 9,600 | 11.9 | 11.4 | 40 | −9.1 | In specification | In specification | 0 |
| *27 | 1,180 | | | | Semiconductorized | | | | |
| 28 | 1,180 | 12,000 | 14.7 | 11.0 | 25 | −10.6 | In specification | In specification | 0 |
| 29 | 1,180 | 10,800 | 10.8 | 11.3 | 29 | −11.7 | In specification | In specification | 0 |
| *30 | 1,180 | 9,100 | 11.0 | 11.1 | 38 | −13.1 | In specification | In specification | 0 |
| *31 | 1,250 | 7,800 | 8.8 | 9.0 | Not measurable | −7.8 | In specification | In specification | 0 |
| 32 | 1,200 | 10,200 | 12.1 | 11.0 | 22 | −9.3 | In specification | In specification | 0 |
| 33 | 1,180 | 11,300 | 13.5 | 11.0 | 20 | −10.3 | In specification | In specification | 2 |
| *34 | 1,160 | 11,000 | 12.8 | 11.1 | 5 | −9.6 | In specification | In specification | 8 |
| *35 | 1,250 | 10,100 | 12.2 | 11.2 | 4 | −13.5 | In specification | In specification | 0 |
| 36 | 1,200 | 10,600 | 12.8 | 11.3 | 20 | −12.4 | In specification | In specification | 0 |
| 37 | 1,180 | 12,500 | 14.5 | 11.4 | 31 | −11.3 | In specification | In specification | 0 |
| 38 | 1,160 | 11,500 | 13.5 | 11.3 | 22 | −10.4 | In specification | In specification | 0 |
| 39 | 1,160 | 10,800 | 14.8 | 11.0 | 20 | −9.5 | In specification | In specification | 0 |
| *40 | 1,160 | 9,000 | 10.7 | 11.5 | 16 | −8.4 | In specification | In specification | 0 |

In Tables 1 and 2, Sample Nos. provided with * indicate the samples are out of the range of the present invention.

According to Samples 2 to 4, 6, 7, 9, 10, 12 to 14, 16, 17, 20, 21, 24, 25, 28, 29, 32, 33 and 36 to 39, which are in the range of the present invention, the following equations, $0.995 \leq k \leq 1.010$, $0 \leq w < 0.04$, $0 \leq x \leq 0.04$, $0 \leq y \leq 0.10$, $0 \leq z \leq 0.05$, $0.015 \leq m \leq 0.035$, $0.015 \leq n \leq 0.035$, $0.01 \leq p \leq 1.0$, $0.5 \leq q \leq 2.5$, and $0.01 \leq r \leq 5.0$ are all satisfied, as shown in Table 1.

As a result, Table 2 shows that sintering can be performed at a firing temperature of 1,200° C. or less; a dielectric constant of 10,000 or more is obtained; as for the dielectric loss, tan δ is 16.0% or less is satisfied, and a more preferable property, such as a tan δ of 12.5% or less, is satisfied in many samples; and as the resistivity, log ρ (ρ: Ω·cm) is 11.0 or more is satisfied. In addition, although the thickness of the dielectric ceramic layer is smaller than 2 μm, such as 1.5 μm, a mean time to failure of 20 hours or more can be obtained; as for the rate of change with time in electrostatic capacity at room temperature, a property within −12% is achieved, and a more preferably property of within −10% is also achieved in many samples: the F characteristic and the Y5V characteristic are both within the respective specifications; and the fraction defective can be decreased to within 10%.

On the other hand, Sample 1 is out of the range of the present invention since k is less than 0.995 as shown in Table 1, and the resistivity log ρ is low, such as less than 11.0, and the mean time to failure cannot be measured, as shown in Table 2. In addition, when k is more than 1.010 as shown in Table 1, Sample 5, the relative dielectric constant is low, and the mean time to failure is short, as shown in Table 2.

According to Sample 8, which is out of the range of the present invention since w is 0.04 or more as shown in Table 1, the relative dielectric constant is low as shown in Table 2.

In Sample 11, which is out of the range of the present invention since x is more than 0.04 as shown in Table 1, the relative dielectric constant is low and the mean time to failure is short, as shown in Table 2.

According to Sample 15, which is out of the range of the present invention since y is more than 0.10 as shown in Table 1, the relative dielectric constant is low and the mean time to failure is short, as shown in Table 2.

In Sample 18, which is out of the range of the present invention since z is more than 0.05 as shown in Table 1, the mean time to failure is short as shown in Table 2.

According to Sample 19, which is out of the range of the present invention since m is less than 0.015 as shown in Table 1, the resistivity log ρ is low, such as less than 11.0, and the mean time to failure is short, as shown in Table 2. On the other hand, with Sample 22, where m is more than 0.035 as shown in Table 1, the relative dielectric constant is low as shown in Table 2.

According to Sample 23, which is out of the range of the present invention since n is less than 0.015 as shown in Table 1, the resistivity log ρ is low, such as less than 11.0, and the mean time to failure is short, as shown in Table 2. On the other hand, in Sample 26, where n is more than 0.035 as shown in Table 1, the relative dielectric constant is low as shown in Table 2.

According to Sample 27, which is out of the range of the present invention since p is less than 0.01 as shown in Table 1, the resistivity is low so as to be a semiconductor value as shown in Table 2. On the other hand, in Sample 30, where p is more than 1.0 as shown in Table 1, the relative dielectric constant is low and the absolute value of the rate of change with time in electrostatic capacity is large, as shown in Table 2.

According to Sample 31, which is out of the range of the present invention since q is less than 0.5 as shown in Table 1, the sintering properties are inferior, and as shown in Table 2, the relative dielectric constant is low, the resistivity log ρ is less than 11.0, and the mean time to failure cannot be measured. On the other hand, in Sample 34, where q is more than 2.5, the mean time to failure is short and the fraction defective is increased, as shown in Table 2.

According to Sample 35, which is out of the range of the present invention since r is less than 0.01 as shown in Table 1, the mean time to failure is short and the absolute value of the rate of change with time in electrostatic capacity is large, as shown in Table 2. In Sample 40, r is more than 5.0, and the dielectric constant is low and the mean time to failure is short, as shown in Table 2.

Experimental Example 2

As starting materials for a dielectric ceramic, an $Re_2O_3$ powder was prepared in addition to the materials prepared in Experimental Example 1. By a method similar to that in Experimental Example 1, a powdered primary component was synthesized so as to obtain molar ratios shown in Table 3.

Subsequently, $MnCO_3$, $SiO_2$, and $CuO$ powders were added to this powdered primary component in accordance with the molar ratios shown in Table 3, and the powdered $Re_2O_3$ was also added in accordance with an R element and the molar ratio shown in Table 3, followed by mixing, so that powdered dielectric ceramic starting materials for respective samples were obtained.

In this Example, the composition of the primary component itself, and the composition ratios of the primary component to $MnO_2$, $SiO_2$ and $CuO$ of Samples 41 to 71 are similar to those of Sample 3 shown in Table 1 of Experimental Example 1. Sample 41 in which [s] is [0.00], that is, $Re_2O_3$ is not included, is the same as Sample 3.

TABLE 3

$100(Ba_{1-w-x-m}Ca_wSr_xGd_m)_k(Ti_{1-y-z-n}Zr_yHf_zMg_n)O_{3+a} + pMnO_2 + qSiO_2 + rCuO + sRe_2O_3$

| SAMPLE NO. | k | w | x | y | z | m | n | p | q | r | s | Re ELEMENT/ NUMBER OF MOLES |
|---|---|---|---|---|---|---|---|---|---|---|---|---|
| 41 | 1.002 | 0.02 | 0.00 | 0.05 | 0.00 | 0.025 | 0.025 | 0.5 | 1.5 | 2.5 | 0.00 | |
| 42 | 1.002 | 0.02 | 0.00 | 0.05 | 0.00 | 0.025 | 0.025 | 0.5 | 1.5 | 2.5 | 0.10 | Y/0.10 |
| 43 | 1.002 | 0.02 | 0.00 | 0.05 | 0.00 | 0.025 | 0.025 | 0.5 | 1.5 | 2.5 | 0.10 | Sm/0.10 |
| 44 | 1.002 | 0.02 | 0.00 | 0.05 | 0.00 | 0.025 | 0.025 | 0.5 | 1.5 | 2.5 | 0.10 | Dy/0.05, Eu/0.05 |
| 45 | 1.002 | 0.02 | 0.00 | 0.05 | 0.00 | 0.025 | 0.025 | 0.5 | 1.5 | 2.5 | 0.30 | Y/0.30 |
| 46 | 1.002 | 0.02 | 0.00 | 0.05 | 0.00 | 0.025 | 0.025 | 0.5 | 1.5 | 2.5 | 0.30 | Sm/0.30 |
| 47 | 1.002 | 0.02 | 0.00 | 0.05 | 0.00 | 0.025 | 0.025 | 0.5 | 1.5 | 2.5 | 0.30 | Dy/0.10, Eu/0.20 |
| 48 | 1.002 | 0.02 | 0.00 | 0.05 | 0.00 | 0.025 | 0.025 | 0.5 | 1.5 | 2.5 | 0.50 | Y/0.50 |
| 49 | 1.002 | 0.02 | 0.00 | 0.05 | 0.00 | 0.025 | 0.025 | 0.5 | 1.5 | 2.5 | 0.50 | Sm/0.50 |
| 50 | 1.002 | 0.02 | 0.00 | 0.05 | 0.00 | 0.025 | 0.025 | 0.5 | 1.5 | 2.5 | 0.50 | Eu/0.50 |
| 51 | 1.002 | 0.02 | 0.00 | 0.05 | 0.00 | 0.025 | 0.025 | 0.5 | 1.5 | 2.5 | 0.50 | Tb/0.50 |
| 52 | 1.002 | 0.02 | 0.00 | 0.05 | 0.00 | 0.025 | 0.025 | 0.5 | 1.5 | 2.5 | 0.50 | Dy/0.50 |
| 53 | 1.002 | 0.02 | 0.00 | 0.05 | 0.00 | 0.025 | 0.025 | 0.5 | 1.5 | 2.5 | 0.50 | Ho/0.50 |
| 54 | 1.002 | 0.02 | 0.00 | 0.05 | 0.00 | 0.025 | 0.025 | 0.5 | 1.5 | 2.5 | 0.50 | Er/0.50 |
| 55 | 1.002 | 0.02 | 0.00 | 0.05 | 0.00 | 0.025 | 0.025 | 0.5 | 1.5 | 2.5 | 0.50 | Tm/0.50 |
| 56 | 1.002 | 0.02 | 0.00 | 0.05 | 0.00 | 0.025 | 0.025 | 0.5 | 1.5 | 2.5 | 0.50 | Yb/0.50 |
| 57 | 1.002 | 0.02 | 0.00 | 0.05 | 0.00 | 0.025 | 0.025 | 0.5 | 1.5 | 2.5 | 0.50 | Sm/0.30, Y/0.20 |
| 58 | 1.002 | 0.02 | 0.00 | 0.05 | 0.00 | 0.025 | 0.025 | 0.5 | 1.5 | 2.5 | 0.50 | Dy/0.15, Eu/0.35 |
| 59 | 1.002 | 0.02 | 0.00 | 0.05 | 0.00 | 0.025 | 0.025 | 0.5 | 1.5 | 2.5 | 0.50 | Sm/0.20, Dy/0.20 Ho/0.10 |
| * 60 | 1.002 | 0.02 | 0.00 | 0.05 | 0.00 | 0.025 | 0.025 | 0.5 | 1.5 | 2.5 | 0.70 | Y/0.70 |
| * 61 | 1.002 | 0.02 | 0.00 | 0.05 | 0.00 | 0.025 | 0.025 | 0.5 | 1.5 | 2.5 | 0.70 | Sm/0.70 |
| * 62 | 1.002 | 0.02 | 0.00 | 0.05 | 0.00 | 0.025 | 0.025 | 0.5 | 1.5 | 2.5 | 0.70 | Eu/0.70 |
| * 63 | 1.002 | 0.02 | 0.00 | 0.05 | 0.00 | 0.025 | 0.025 | 0.5 | 1.5 | 2.5 | 0.70 | Tb/0.70 |
| * 64 | 1.002 | 0.02 | 0.00 | 0.05 | 0.00 | 0.025 | 0.025 | 0.5 | 1.5 | 2.5 | 0.70 | Dy/0.70 |
| * 65 | 1.002 | 0.02 | 0.00 | 0.05 | 0.00 | 0.025 | 0.025 | 0.5 | 1.5 | 2.5 | 0.70 | Ho/0.70 |
| * 66 | 1.002 | 0.02 | 0.00 | 0.05 | 0.00 | 0.025 | 0.025 | 0.5 | 1.5 | 2.5 | 0.70 | Er/0.70 |
| * 67 | 1.002 | 0.02 | 0.00 | 0.05 | 0.00 | 0.025 | 0.025 | 0.5 | 1.5 | 2.5 | 0.70 | Tm/0.70 |
| * 68 | 1.002 | 0.02 | 0.00 | 0.05 | 0.00 | 0.025 | 0.025 | 0.5 | 1.5 | 2.5 | 0.70 | Yb/0.70 |
| * 69 | 1.002 | 0.02 | 0.00 | 0.05 | 0.00 | 0.025 | 0.025 | 0.5 | 1.5 | 2.5 | 0.70 | Sm/0.40, Y/0.30 |
| * 70 | 1.002 | 0.02 | 0.00 | 0.05 | 0.00 | 0.025 | 0.025 | 0.5 | 1.5 | 2.5 | 0.70 | Dy/0.25, Eu/0.45 |
| * 71 | 1.002 | 0.02 | 0.00 | 0.05 | 0.00 | 0.025 | 0.025 | 0.5 | 1.5 | 2.5 | 0.70 | Sm/0.30, Dy/0.20 Ho/0.20 |

Subsequently, by a method similar to that in Experimental Example 1, multilayer ceramic capacitors were formed, and evaluations similar to those described above were performed. The evaluation results are shown in Table 5.

TABLE 4

| Sample No. | Firing Temperature (° C.) | Relative Dielectric Constant | tan δ (%) | Resistivity log ρ (ρ:Ω · cm) | Mean Time to Failure (Hours) | Rate of Change with Time in Electrostatic Capacity at Room Temperature (%) | F Characteristic | Y5V Characteristic | Fraction Defective (%) |
|---|---|---|---|---|---|---|---|---|---|
| 41 | 1,180 | 12,100 | 14.0 | 11.3 | 26 | −10.7 | In specification | In specification | 0 |
| 42 | 1,180 | 11,800 | 13.5 | 11.2 | 23 | −10.3 | In specification | In specification | 0 |
| 43 | 1,170 | 11,900 | 13.8 | 11.1 | 26 | −10.4 | In specification | In specification | 0 |
| 44 | 1,170 | 11,700 | 13.7 | 11.3 | 27 | −10.3 | In specification | In specification | 0 |
| 45 | 1,180 | 11,500 | 13.1 | 11.1 | 28 | −9.9 | In specification | In specification | 0 |

TABLE 4-continued

| Sample No. | Firing Temperature (° C.) | Relative Dielectric Constant | tan δ (%) | Resistivity log ρ (ρ:Ω · cm) | Mean Time to Failure (Hours) | Rate of Change with Time in Electrostatic Capacity at Room Temperature (%) | F Characteristic | Y5V Characteristic | Fraction Defective (%) |
|---|---|---|---|---|---|---|---|---|---|
| 46 | 1,170 | 11,600 | 13.7 | 11.2 | 30 | −10.0 | In specification | In specification | 0 |
| 47 | 1,170 | 11,400 | 13.4 | 11.4 | 32 | −9.9 | In specification | In specification | 0 |
| 48 | 1,180 | 11,300 | 12.8 | 11.2 | 20 | −9.4 | In specification | In specification | 0 |
| 49 | 1,160 | 11,300 | 13.6 | 11.1 | 25 | −9.5 | In specification | In specification | 0 |
| 50 | 1,160 | 11,100 | 12.8 | 11.3 | 26 | −9.9 | In specification | In specification | 0 |
| 51 | 1,180 | 10,800 | 12.6 | 11.4 | 33 | −9.2 | In specification | In specification | 0 |
| 52 | 1,180 | 10,600 | 12.3 | 11.2 | 30 | −9.2 | In specification | In specification | 0 |
| 53 | 1,180 | 10,600 | 12.7 | 11.3 | 31 | −9.2 | In specification | In specification | 0 |
| 54 | 1,200 | 10,500 | 12.4 | 11.2 | 30 | −9.1 | In specification | In specification | 2 |
| 55 | 1,200 | 10,300 | 12.0 | 11.2 | 35 | −9.0 | In specification | In specification | 0 |
| 56 | 1,200 | 10,000 | 12.0 | 11.3 | 37 | −8.9 | In specification | In specification | 0 |
| 57 | 1,160 | 11,100 | 13.1 | 11.1 | 24 | −9.7 | In specification | In specification | 1 |
| 58 | 1,160 | 11,100 | 13.1 | 11.4 | 27 | −9.6 | In specification | In specification | 0 |
| 59 | 1,180 | 11,100 | 13.3 | 11.3 | 28 | −9.7 | In specification | In specification | 1 |
| *60 | 1,180 | 9,800 | 12.4 | 11.3 | 30 | −9.0 | In specification | In specification | 0 |
| *61 | 1,160 | 9,800 | 12.9 | 11.3 | 34 | −8.9 | In specification | In specification | 0 |
| *62 | 1,160 | 9,500 | 12.3 | 11.5 | 40 | −8.9 | In specification | In specification | 0 |
| *63 | 1,180 | 9,400 | 12.0 | 11.5 | 42 | −8.6 | In specification | In specification | 0 |
| *64 | 1,180 | 9,100 | 11.8 | 11.3 | 41 | −8.7 | In specification | In specification | 0 |
| *65 | 1,180 | 9,000 | 11.6 | 11.4 | 43 | −8.5 | In specification | In specification | 0 |
| *66 | 1,200 | 8,900 | 11.7 | 11.4 | 41 | −8.5 | In specification | In specification | 1 |
| *67 | 1,200 | 8,800 | 11.6 | 11.3 | 46 | −8.2 | In specification | In specification | 0 |
| *68 | 1,200 | 8,600 | 11.4 | 11.5 | 46 | −7.9 | In specification | In specification | 0 |
| *69 | 1,160 | 9,600 | 12.5 | 11.2 | 33 | −8.9 | In specification | In specification | 0 |
| *70 | 1,160 | 9,500 | 12.6 | 11.5 | 36 | −9.0 | In specification | In specification | 0 |
| *71 | 1,180 | 9,700 | 12.7 | 11.4 | 38 | −8.9 | In specification | In specification | 0 |

In Tables 3 and 4, Sample Nos. provided with * are samples in which the content of $Re_2O_3$ is outside of the preferable range.

According to Samples 42 to 71 containing $Re_2O_3$, the absolute value of the rate of change with time in electrostatic capacity can be decreased as compared to that of Sample 41 in which $Re_2O_3$ is not present, as shown in Table 4.

In addition, the relative dielectric constant of Samples 60 to 71 in which the content of $Re_2O_3$ is more than 0.50 moles with respect to 100 moles of the primary component, as shown in Table 4, is low compared to that of Samples 42 to 59 in which the content is 0.50 moles or less. Hence, it is understood that when $Re_2O_3$ is present, the content thereof is preferably 0.50 moles or less with respect to 100 moles of the primary component.

Experimental Example 3

Experimental Example 3 was performed to investigate the influence of manufacturing methods to properties or characteristics of samples.

Sample 3 of Experimental Example 1 was used as a standard. In order to obtain a multilayer ceramic capacitor as a comparative object, designated Sample 3a, conditions similar to those for Sample 3 of Experimental Example 1 were used except that at the stage at which powdered dielectric ceramic starting materials were prepared, $Gd_2O_3$ and $MgCO_3$ powders were not mixed with $BaCO_3$, $CaCO_3$, $TiO_2$ and $ZrO_2$ and were simultaneously added together with $MnCO_3$, $SiO_2$ and CuO, in a subsequent step.

As for Sample 3 obtained in Experimental Example 1 described above and Sample 3a obtained as described above, after an arbitrary cross-section of each multilayer ceramic capacitor was cut off, polished, and hot-etched at a temperature of 1,200° C., seven arbitrary points were observed by a SEM. The magnification of the SEM was 2,000 times, and the size of field of view at each point was 12 μm×9 μm. The particle diameters of all ceramic particles present in one field of view were evaluated by the diameter measurement method, and the average value, the maximum value, the minimum value, the standard deviation σ, and 3 CV (=σ/average value× 3×100) [%] of the particle diameter were obtained.

In Table 5, the evaluation results of Sample 3 are shown, and in Table 6, the evaluation results of Sample 3a are shown.

TABLE 5

| SAMPLE 3 | FIELD OF VIEW A-1 | FIELD OF VIEW A-2 | FIELD OF VIEW A-3 | FIELD OF VIEW A-4 | FIELD OF VIEW A-5 | FIELD OF VIEW A-6 | FIELD OF VIEW A-7 |
|---|---|---|---|---|---|---|---|
| AVERAGE (μm) | 1.42 | 1.15 | 1.19 | 1.25 | 1.32 | 1.04 | 1.18 |
| MAXIMUM (μm) | 3.24 | 2.24 | 2.24 | 2.65 | 2.18 | 2.18 | 3.24 |
| MINIMUM (μm) | 0.47 | 0.41 | 0.41 | 0.29 | 0.47 | 0.24 | 0.59 |
| σ (μm) | 0.54 | 0.50 | 0.47 | 0.60 | 0.48 | 0.50 | 0.53 |
| 3CV | 114.37 | 129.67 | 118.00 | 143.66 | 108.97 | 145.10 | 133.69 |

TABLE 6

| SAMPLE 3a | FIELD OF VIEW B-1 | FIELD OF VIEW B-2 | FIELD OF VIEW B-3 | FIELD OF VIEW B-4 | FIELD OF VIEW B-5 | FIELD OF VIEW B-6 | FIELD OF VIEW B-7 |
|---|---|---|---|---|---|---|---|
| AVERAGE (μm) | 1.62 | 1.16 | 1.21 | 1.39 | 1.32 | 1.24 | 1.05 |
| MAXIMUM (μm) | 5.64 | 2.98 | 3.28 | 3.53 | 4.18 | 4.32 | 3.73 |
| MINIMUM (μm) | 0.39 | 0.25 | 0.27 | 0.24 | 0.31 | 0.20 | 0.16 |
| σ (μm) | 1.20 | 0.93 | 0.97 | 1.17 | 0.96 | 1.08 | 0.90 |
| 3CV | 223.25 | 241.29 | 241.04 | 250.86 | 218.23 | 260.75 | 257.16 |

When Table 5 and Table 6 are compared to each other, it is found that Sample 3 has a smaller deviation of particle diameter compared to that of Sample 3a.

Next, Sample 3a was processed by a method similar to that performed for Sample 3 of Experimental Example 1, so that the "mean time to failure" was obtained. The result is shown in Table 7. In order to make comparison easier, the "mean time to failure" of Sample 3 shown in Table 2 is also shown in Table 7.

TABLE 7

| | Mean Time to Failure |
|---|---|
| Sample 3 | 26 hours |
| Sample 3a | 11 hours |

As can be seen from Table 7, Sample 3 can obtain a long mean time to failure compared to that of Sample 3a.

The results of Experimental Example 3 described above can be evaluated as follows.

In Sample 3a, Gd and Mg, which are starting materials in Sample 3, were not added at the first preparation stage but were simultaneously added in the subsequent step in which Mn, Si and Cu were added, and it is estimated that the degrees of solid solubility of Gd and Mg in the primary component are low, and hence, as shown in Table 6, the deviation of particle diameter is large, resulting in degradation in reliability as shown in Table 7. Accordingly, it is found that Gd and Mg are preferably mixed and calcined with Ba and Ti at the first preparation stage.

The invention claimed is:

1. A dielectric ceramic having a composition represented by the general formula:

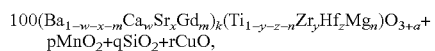
$100(Ba_{1-w-x-m}Ca_wSr_xGd_m)_k(Ti_{1-y-z-n}Zr_yHf_zMg_n)O_{3+a} + pMnO_2 + qSiO_2 + rCuO$, wherein $(Ba_{1-w-x-m}Ca_wSr_xGd_m)_k(Ti_{1-y-z-n}Zr_yHf_zMg_n)O_{3+a}$ is a primary component, k, w, x, y, z, m, n, p, q and r are each mole values,
$0.995 \leq k \leq 1.010$,
$0 \leq w < 0.04$,
$0 \leq x \leq 0.04$,
$0 \leq y \leq 0.10$,
$0 \leq z \leq 0.05$,
$0.015 \leq m \leq 0.035$,
$0.015 \leq n \leq 0.035$,
$0.01 \leq p \leq 1.0$,
$0.5 \leq q \leq 2.5$,
$0.01 \leq r \leq 5.0$, and
a is a value selected with respect to the deviation from 3 so that the primary component is electrically neutral.

2. The dielectric ceramic according to claim 1, further comprising as an additive component, a positive amount up to 0.50 moles of $Re_2O_3$ with respect to 100 moles of the primary component, wherein Re is at least one member selected from the group consisting of Y, Sm, Eu, Tb, Dy, Ho, Er, Tm and Yb.

3. The dielectric ceramic according to claim 2, wherein $k \leq 1.002, w < 0.03, x \leq 0.02, y \leq 0.05, z \leq 0.02, m \leq 0.025, n \leq 0.025, p \leq 0.5, q \leq 1.5, r \leq 4$, and the amount of $Re_2O_3$ is at least 0.1 moles.

4. The dielectric ceramic according to claim 3, wherein Re is one or a combination of 2 or 3 members of said group.

5. The dielectric ceramic according to claim 4, wherein Re comprises Y or Sm.

6. A multilayer ceramic capacitor comprising a laminate comprising a plurality of laminated dielectric ceramic layers with a plurality of internal electrodes disposed at specific interfaces between the dielectric ceramic layers and overlapped with each other in the lamination direction; and external electrodes on external surfaces of the laminate electrically connected to specific internal electrodes, wherein the dielectric ceramic layers comprise the dielectric ceramic according to claim 5.

7. The multilayer ceramic capacitor according to claim 6, wherein the internal electrodes comprise a base metal.

8. A multilayer ceramic capacitor comprising a laminate comprising a plurality of laminated dielectric ceramic layers with a plurality of internal electrodes disposed at specific interfaces between the dielectric ceramic layers and overlapped with each other in the lamination direction; and external electrodes on external surfaces of the laminate electrically connected to specific internal electrodes, wherein the dielectric ceramic layers comprise the dielectric ceramic according to claim 3.

9. The multilayer ceramic capacitor according to claim 8, wherein the internal electrodes comprise a base metal.

10. A multilayer ceramic capacitor comprising a laminate comprising a plurality of laminated dielectric ceramic layers with a plurality of internal electrodes disposed at specific interfaces between the dielectric ceramic layers and overlapped with each other in the lamination direction; and external electrodes on external surfaces of the laminate electrically connected to specific internal electrodes, wherein the dielectric ceramic layers comprise the dielectric ceramic according to claim 4.

11. The multilayer ceramic capacitor according to claim 10, wherein the internal electrodes comprise a base metal.

12. A multilayer ceramic capacitor comprising a laminate comprising a plurality of laminated dielectric ceramic layers with a plurality of internal electrodes disposed at specific interfaces between the dielectric ceramic layers and overlapped with each other in the lamination direction; and external electrodes on external surfaces of the laminate electrically connected to specific internal electrodes, wherein the dielectric ceramic layers comprise the dielectric ceramic according to claim 2.

13. A multilayer ceramic capacitor comprising a laminate comprising a plurality of laminated dielectric ceramic layers with a plurality of internal electrodes disposed at specific interfaces between the dielectric ceramic layers and overlapped with each other in the lamination direction; and external electrodes on external surfaces of the laminate electrically connected to specific internal electrodes, wherein the dielectric ceramic layers comprise the dielectric ceramic according to claim 1.

14. The dielectric ceramic according to claim 1, wherein k=1.002, w=0.02, x=0, y=0.05, z=0, m=0.025, n=0.025, p=0.5, q=1.5 and r=2.5.

15. A multilayer ceramic capacitor comprising a laminate comprising a plurality of laminated dielectric ceramic layers with a plurality of internal electrodes disposed at specific interfaces between the dielectric ceramic layers and overlapped with each other in the lamination direction; and external electrodes on external surfaces of the laminate electrically connected to specific internal electrodes, wherein the dielectric ceramic layers comprise the dielectric ceramic according to claim 14.

16. The multilayer ceramic capacitor according to claim 15, wherein the internal electrodes comprise a base metal.

17. The dielectric ceramic according to claim 1, wherein $k \leqq 1.002, w<0.03, x \leqq 0.02, y \leqq 0.05, z \leqq 0.02, m \leqq 0.025, n \leqq 0.025, p \leqq 0.5, q \leqq 1.5,$ and $r \leqq 4$.

18. A multilayer ceramic capacitor comprising a laminate comprising a plurality of laminated dielectric ceramic layers with a plurality of internal electrodes disposed at specific interfaces between the dielectric ceramic layers and overlapped with each other in the lamination direction; and external electrodes on external surfaces of the laminate electrically connected to specific internal electrodes, wherein the dielectric ceramic layers comprise the dielectric ceramic according to claim 17.

19. The multilayer ceramic capacitor according to claim 13, wherein the internal electrodes comprise a base metal.

20. The multilayer ceramic capacitor according to claim 13, wherein the internal electrodes comprise a base metal.

* * * * *